United States Patent [19]

Rubin

[11] Patent Number: 5,080,042
[45] Date of Patent: Jan. 14, 1992

[54] ANIMAL PLAY UNIT

[76] Inventor: Berl I. Rubin, 242 Erica Street, Philadelphia, Pa. 19116

[21] Appl. No.: 624,601

[22] Filed: Dec. 10, 1990

[51] Int. Cl.$^5$ ............................................. A01K 15/00
[52] U.S. Cl. ...................................... 119/29; 272/113
[58] Field of Search ............................ 119/15, 19, 29; 446/476, 478, 482; 272/113

[56] References Cited

U.S. PATENT DOCUMENTS

| | | | |
|---|---|---|---|
| 2,883,192 | 4/1959 | Royston | 272/113 |
| 3,485,494 | 12/1969 | Lieberman | 272/113 |
| 3,561,757 | 2/1971 | Schillig | 272/113 |
| 4,301,766 | 11/1981 | Piccone | 119/29 X |
| 4,347,807 | 9/1982 | Reich | 119/29 X |

Primary Examiner—Gene Mancene
Assistant Examiner—R. Thomas Price
Attorney, Agent, or Firm—John Shaw Stevenson

[57] ABSTRACT

An animal play unit for self amusement and for enhancing movement, agility and jumping ability of animals. The play unit is a frame shaped structure having portions thereof interconnected to form multiple open passageways through which an animal can move. The frame structure is of a hollow cube shaped configuration that has panels selectively mounted in dfferent external positions of the cubically shaped frame for closing off top or bottom or any one or more of its four open side surfaces. A number of these cubes are adapted to be interconnected with one another to provide additional passageways and jumping areas as the animal moves from one hollow structual cube to or through another. The multi-cubical shaped frame structure has carpeted wood panels which can be selectively mounted for each play time on the cubical shaped frame in any one of a different number of top, bottom or side positions of the cube to provide a large number of different play passageways and jumping areas through which the animal can move.

7 Claims, 3 Drawing Sheets

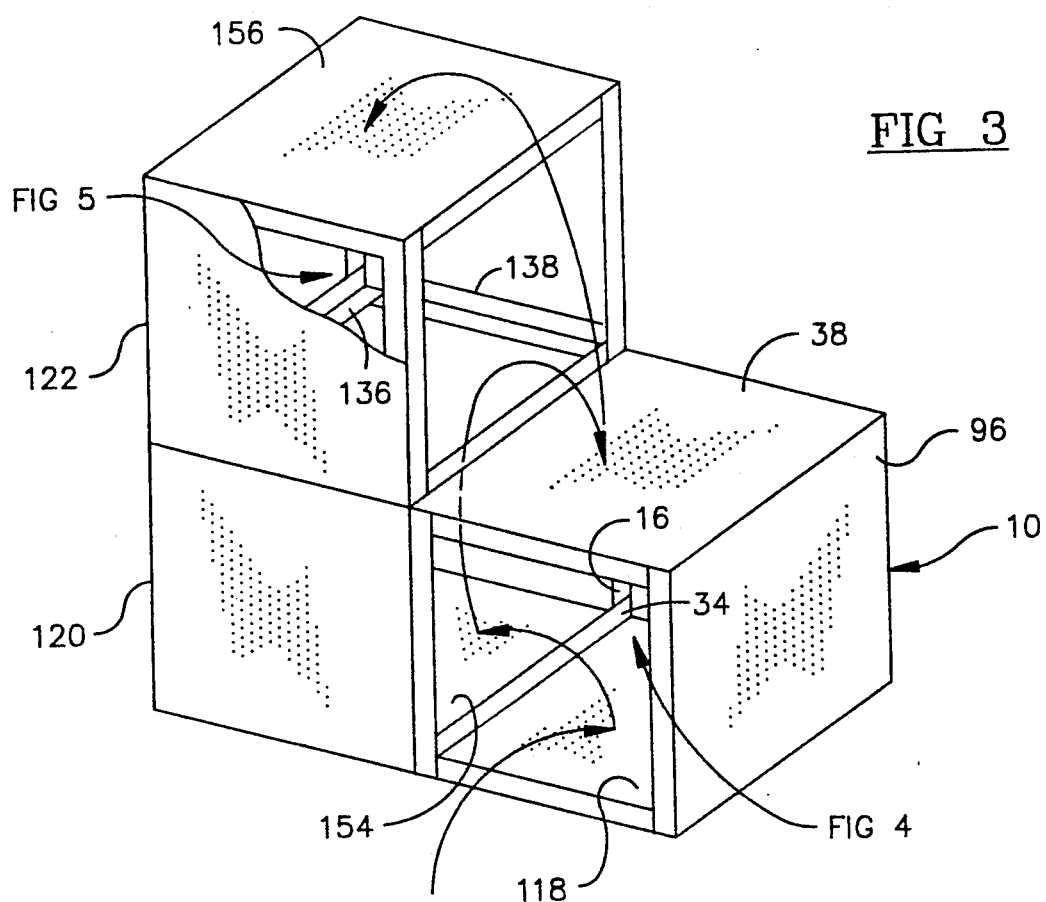
FIG 3
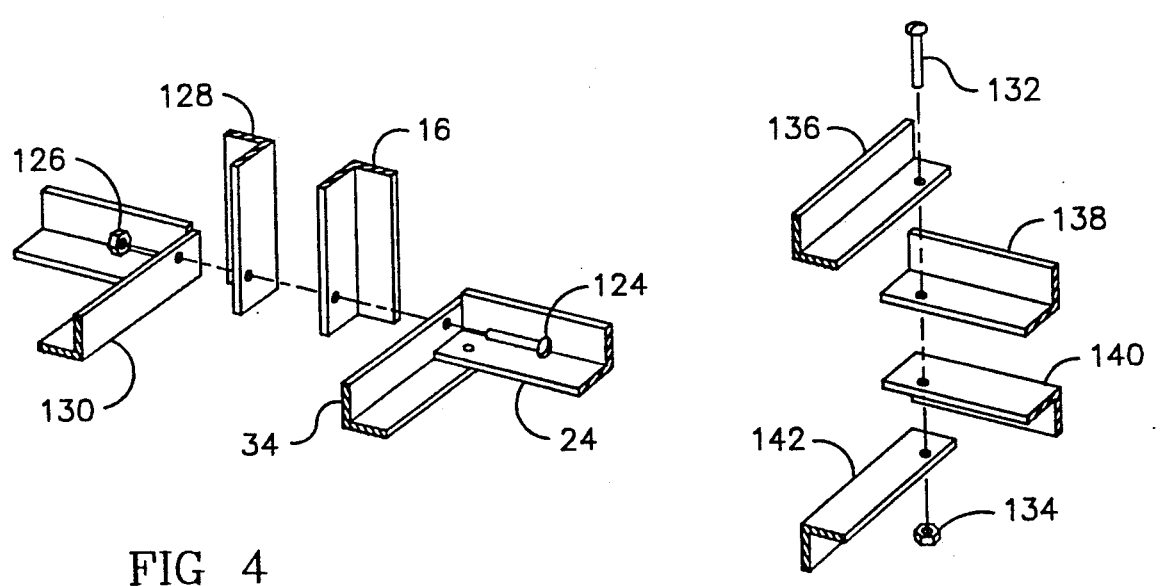
FIG 4
FIG 5

ANIMAL PLAY UNIT

BACKGROUND OF THE INVENTION

The present invention relates to an animal play structure for animals such as for those members of the feline or cat family.

Prior devices that have heretofore been available as play devices for animals of this type have been squeeky artifical mice per se or a play mouse mounted on the end of a string so that the mouse can be pulled away from the cat by pulling on the opposite end of the string. Although these devices provide the cat with a play toy, they are not satisfactory because they provide the cat with only very limited, short movement while he is playing with these toys. The animal play unit constructed of a frame, shaped in the form of one or more interconnected open cubes that is covered by this invention, does not limit the cat to short play movements as is the case when toys of the aforementioned type are used but rather enables the cat to enhance is innate ability to perform long play movements as it passes through passageways formed of cubes that accomodate the size of the cat; e.g., a cube that is one and a half feet square. Another advantage of employing a cubical play unit of this type is that it also permits the cat to exercise and develop its innate jumping ability by allowing the cat to take a large first jump from ground level to a panel that forms the top of a first cube and further jump onto other top panels on cubes that are at a higher elevation than the first mentioned panel. Another disadvantage experienced with the prior play devices for animals is that some animals; e.g., cats, get tired of playing with the same toys. Cats do not, however, get tired of playing when the present type cubical play unit is employed as the play unit. This is so because each of the panels enclosing selected sides, top and bottom of each cubical unit employed in the present invention can be rearranged to different positions on the sides and/or top and/or bottom of each cubical unit. This rearrangement of the panels allows the owner of such a play unit to select any one of a great number of different cubical passageways through which he desires the animal to move. Since this moveable panel feature provides a variety of new passageways through which the animal can travel, it presents a new challenge to and a new area for the animal to play in each time the position of the panels is altered and therefore the animal doesn't tire of making use of this play unit.

SUMMARY OF THE INVENTION

The subject animal play unit can advantageously be used to enhance the inherent swift movement, agility and jumping ability of animals, especially animals of the cat family. The present play unit has one or more cubes that each employ angle shaped bars, preferably made of a light metal; e.g., aluminum, joined together by bolts to form the outer edge surfaces of an open cube. A square piece of wood containing a carpet stapeled to one side thereof is used to form a panel. These panels are used to selectively seal off the outer surface of the top, bottom and/or one, two or three sides of the cube. Any two or more of these play unit cubes can be joined in face to face engagement with one another to form a large variety of multi-cube play structures. When the location of the panels on the sides, top and bottom of one or more cubes is altered, it provides different passages by which the animal can move through the play unit. When a cube or cubes of the play unit are employed on the floor of the room and in a corner thereof, the floor of the room is used in place of a panel to seal off the base of the cube and side walls of the room are used in place of a panel to seal off the side of the cube that is brought into contact with that wall.

Another use to which these carpeted panels can be employed is that they can be positioned on the top of the aforementioned cubes so that they form a grasping surface from and onto which the cat can jump when going from one panel to another.

BRIEF DESCRIPTION OF THE DRAWING

FIG. 3 illustrates one example of how a cubical shaped frame structure of the type shown in FIG. 1 and two other cubical structures having different panel arrangements than FIG. 1 can be assembled.

FIG 4 shows in detail how a corner of the left upper and left lower cubical shaped frame structure shown in FIG. 3 are assembled to form an animal play structure.

FIG. 5 shows in detail how the corner of the lower left and right cubical shaped frame structure shown in FIG. 3 are assembled to form an animal play unit.

DETAILED DESCRIPTION OF THE DRAWINGS

Figure 1:
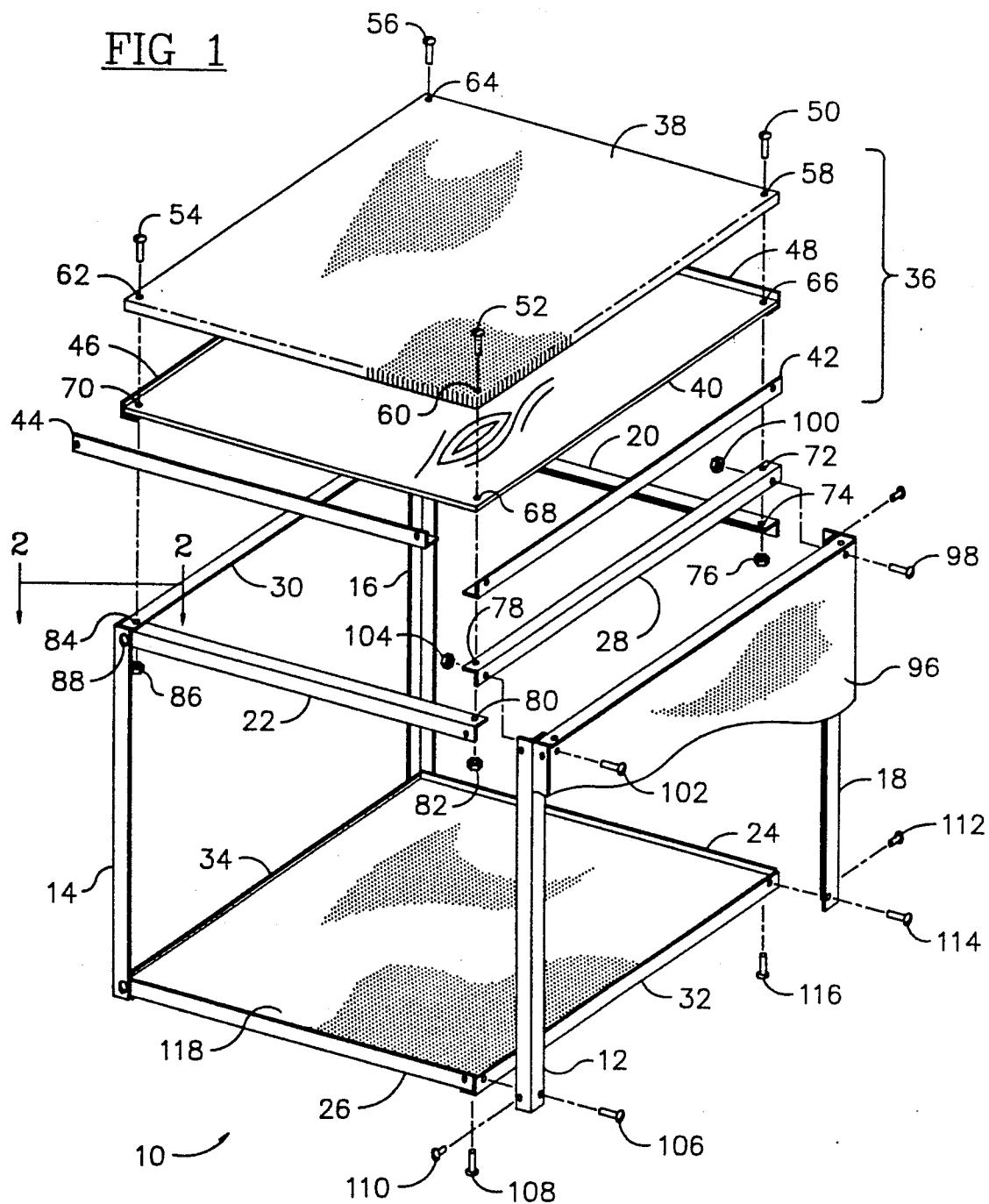
FIG. 1 shows a perspective view of a cubical shaped frame structure with panels mounted on a top, bottom and side surface thereof.

Referring to FIG. 1, the cubical shaped frame structure is designated by general reference numeral 10. The cube shaped frame structure 10 preferably includes four vertical angle shaped bars 12, 14, 16, 18 that are eighteen inches long. The cubical frame structure 10 also includes four horizontal angle shaped bars 20, 22, 24,26 that are seventeen and three quarters inches long. The cubical shaped frame structure also has bars 28,30,32,34 that are seventeen and seven eights inches long. The top portion of FIG. 1 also shows a panel 36. The panel 36 is comprised of a carpet 38 that is cut in the form of a square and is preferably a plush pile type carpet. The panel 36 is also comprised of a plywood board 40 that is the same size as the carpet 38. The carpet 38 is stapled or attached by other means; e.g., glue, not shown, to the board 40. Four angle bars 42,44,46,48 shown near the top of FIG. 1 are of sufficient depth to encompass the outer four edges of the carpet 38 and board. 40.

Four bolts 50, 52 54 56 are employed to pass through the four respectively aligned passageways 58,60,62, 64 in the carpet and through the four respectively aligned passageways only three of which are shown; namely, 66,68,70 in the board 40. These bolts 50, 52,54,56 pass through four other aligned passageways, not shown, to connect one end of angle bar 42 to 48, another end of angle bar 42 to angle bar 44, another end of angle bar 44 to angle bar 46 and another end of angle bar 46 to the end of angle bar 48. The bolt 50, shown in FIG. 1, passes through the passageways 72 and 74 and a locknut 76 on the lower end of bolt 50 connects the right end of bar 48 with bar 20. In a similar manner the bolt 52 passes through the passageways 78,80 and a locknut 82 on the lower end of bolt 52 is used to tightly connect the left end of the bar 28 with bar 22. Also in a similar manner the bolt 54 passes through the aligned passageway 84 in bars 30 and 22 and locknut 86 on the lower end of bolt 54 is used to tightly connect the left end of the bar 30 with the bar 22. In an identical manner to that just described it should be noted that the bolt 56 is employed to pass through passageways, not shown in the corner portions in the left corner portion of bar 20 and the right corner of bar 30 and that these parts are tightly brought together by tightening a locknut, not shown, that is the on lower end of the bolt 56.

Figure 2:
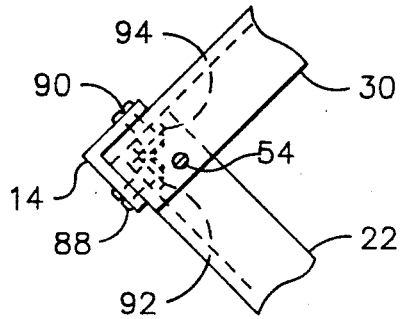
FIG. 2 shows how the corner of the frame shown in FIG. 1 is connected as taken along the line 2—2 of FIG. 1.

From the aforementioned description it can be seen that the four bolt and locknut connections; e.g., 50,76; 52,82; 54,86; 56 and its associated locknut, not shown, when brought into a tight position with one another will provide a sturdy connection between the panel 36 and the upper bar parts 20, 22, 28, 30 of the cubical shaped frame unit 10. The upper ends of the upright bar 14 is connected as shown in FIG. 2 to form fixed corner joints between the vertical bar 14 and horizontal bars 22, 30. This connection is comprised of two bolts 88, 90 and the locknuts 92,94 that fixedly connect the vertical bar 14 to the horizontal bars 22 and 30. The upper ends of each of the other upright bars 12, 16 and 18 are connected in a similar manner to their associated horizontal bars 28, 22; 20,30 and 20,28 in a manner similar to that just described and as shown in FIG. 2.

In the cubical shaped frame unit 10 of FIG. 1 there is also shown an upper portion of a second carpeted wood panel 96. This panel 96 is identical to the panel 36 previously described and is provided with bolt and locknut connection 98,100; 102,104 to attach it to the ends of horizontal bar 28. The lower end of the vertical bar 12 is connected by three bolts 106, 108 110 that have locknuts, not shown, on their inner ends similar to that shown in FIG. 2. This arrangement allows the lower end of vertical bar 12 to be fixedly connected in a sturdy manner with the horizontal bars 26 and 32. Similar bolt and locknut connections 112, 114, 116 are used to retain the vertical bar 18 to its associated horizontal angle bars 32,34. In the lower part of cubical shaped play unit of FIG. 1 there is shown a third carpet wood panel 118 that has a board and carpet that is identical to the panel board 40 and carpet 38, previously described. This panel 118 is provided with bolt and locknut connections identical to those described for panel 36.

FIG. 3 shows how the cubical shaped frame unit 10 shown in detail in FIG. 1 can be interconnected with two other cubical shaped frame units 120,122 that are identical to unit 10 except that their panels are arranged on either a different side or top or bottom of the cube than those shown for cubical unit 10.

FIG. 4 shows how the cubical unit 10 and cubical unit 120, that are shown in FIG. 3, can be connected in a horizontal relation to one another by means of a bolt 124 and locknut 126 connection. Bolt 124 is of suitable length to pass through the horizontal bar 34, vertical bar 16 of cube 10 and the vertical bar 128 and the horizontal bar 130 of cubical unit 120. The locknut 126 is tightened on the bolt 124 to form a tight connection between cubical units 10 and 120. It should be understood that all four adjacent corners of these cubical units 10 and 120 are joined together in the same manner as that just described.

Figure 6:
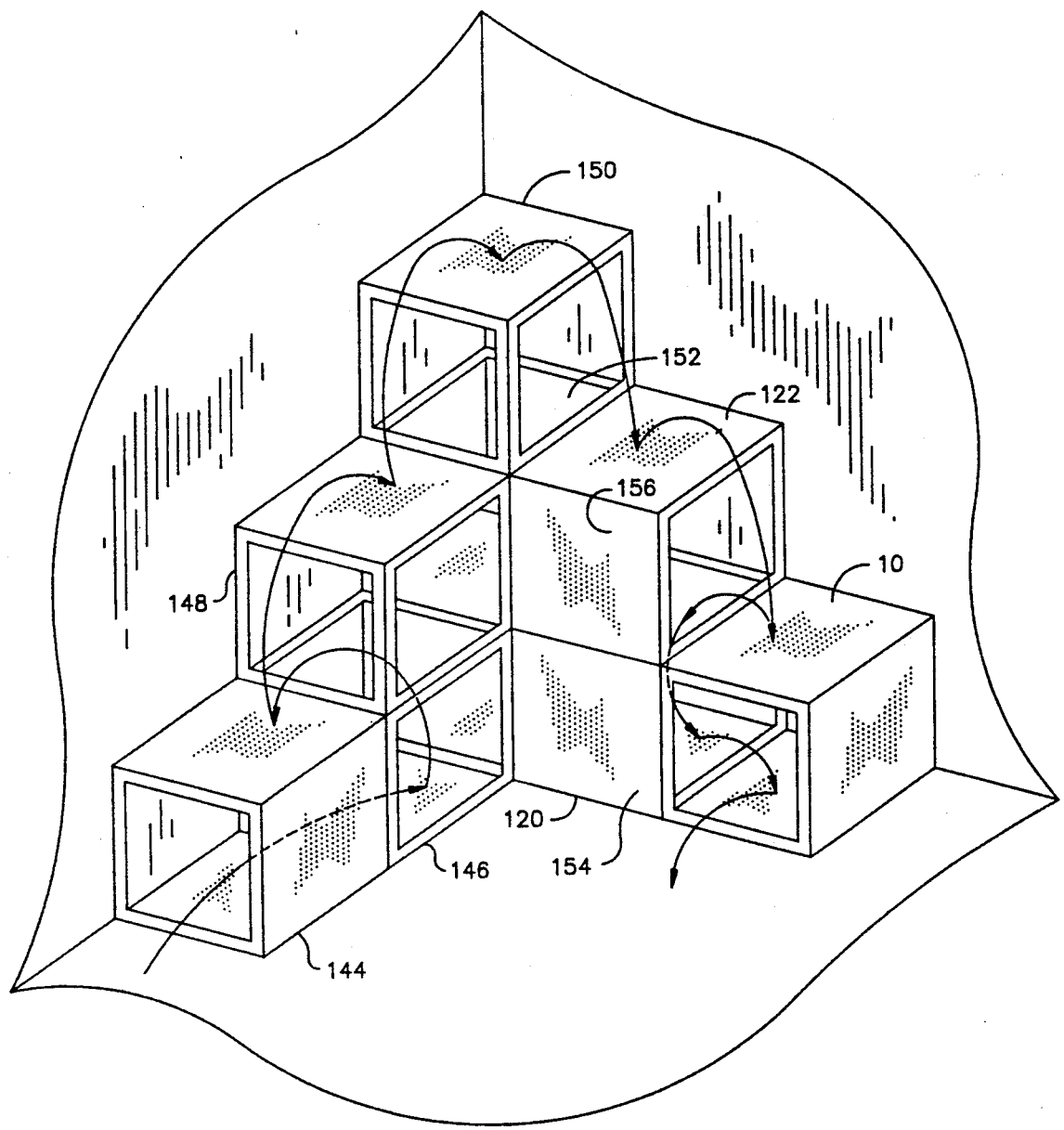
FIG. 6 illustrates still another one of many examples of how a cubical shaped frame structure of the type shown in FIG. 1 and an additional eight other cubes having different panel arrangements than FIG. 1 can be assembled.

FIG. 5 shows how the cubical unit 122 and the cubical unit 120 that are shown in FIG. 3 can be connected in a vertical relation to one another by means of a bolt 132 and a locknut 134 that is of suitable length to pass through the lower horizontal bars 136 and 138 of cube unit 122 and the upper horizontal bars 140, 142 of cube unit 120. The locknut 34 is tightened on the bolt to form a tight connection between the cubical shaped frame units 122 and 120. It should be understood that all four adjacent upper and lower adjacent corners of these cubical units 120,122 are joined together in the same manner as that just described. FIG. 6 shows, in addition to the three cubical units 10,120,122 of FIG. 3, additional units 144, 146, 148, 150, 152 and a cubical unit immediately below cube 152, not shown.

When the animal play structure; e.g., as shown in FIG. 3, is used, it can be seen that an animal such as a cat can jump in the direction of the arrows shown, first through the open front passageway of the cubical unit 10 and land on the carpeted base panel 118. He can then jump onto the carpeted base panel 154 of cubical unit 120, up through the opening in the base of cubical unit 122 and out onto the carpeted wood panel 38 that forms the top surface of cubical unit 10. He can then jump up to the carpeted panel 156 which forms the top surface of cubical unit 122.

When the animal play structure; e.g., as shown in FIG. 6, is to be used indoors, the cubical units shown 10, 120, 122, 144,146, 148, 150, 152 and the cubical unit, not shown but which is immediately below the cubical unit 152, can be placed in the corner of a room. In this position the back of the center cubical units are in engagement with the corner and the back of the other cubical are in engagement with the side walls of the room that form its corner. It can thus be seen that the wall of the room against which the cubical units are engaged can act as single wall panels of a passageway through which the animal can move. It should also be understood that by merely bolting the angle irons that form the cubical units to the floor and/or side wall of the room the sides of base of these cubical units can be securely fixed in a sturdy position.

By following the direction of the arrows shown in FIG. 6, it can be seen how an animal such as a cat can jump through the cubical unit 144 into the base of cubical unit 146 and jump in an upward direction through the open base of the cubical unit 140 onto the top panel surface of cubical unit 144. The animal can then jump onto the top panel of cubical unit 148, onto the top surface of 150, down onto the top panel surface of cubical unit 122, down onto the top panel surface of cubical unit 10, into the open right side of cubical unit 122, through the open base of cubical unit 122, onto the base panel of cubical unit 154, through the right side of the opening in cubical unit 154, onto the base panel of cubical unit 10 and then onto the floor level from which the cat commenced his jumping.

Panels on the side of any of these cubes which face the animal, such as the vertical carpeted panels 154,156 also make ideal "scratch post" areas against which the animal can grasp and scratch with his paws in a playful, beneficial manner.

Although the present invention shows only two cubical panel arrangements; e.g., in FIG. 3 and FIG. 6, it can be seen that by combining a different number of cubical units or arranging them in different juxtapositioned arrays from that shown and/or rearranging the carpeted panels of these cubical units in a different manner to that shown in the drawing, it is thus possible to obtain a great number of new challenging path patterns for animals when this type of play structure is used.

What is claimed is:

1. An animal play unit comprising, at least three interconnected hollow cube shaped frame structures, each of said cube shaped frame structures being constructed of angle bars having portions thereof interconnected to form multiple open passageways that extend through the top, bottom, front, back and side faces of each of said cube shaped frame structures, a first means to connect the angle bars forming one of the faces of one of said cube shaped structures with the angle bars forming a face of a second one of said cube shaped structures, a second means to connect the angle bars forming another face of said first mentioned cube shaped structure with the angle bars forming a face of another one of said cubes, panels, separate ones of said panels being connected to said frame structures, angle bars to close off a first selected number of said passageways that said angle bars form in the top, bottom, front, back and sides of each of said cube shaped structures and thereby allow an animal to move only through the remaining open passageways formed by said cube shaped frame structures, and a means to disconnect said panels from said frame structures for selectively repositioning them on other top, bottom, front, back and side faces of said cube shaped frame structures to close off other selected passageways and to thereby provide different passageways through which the animal can move through said cube shaped frame structures.

2. The animal play unit of claim 1 wherein each one of the panels is comprised of a square shaped piece of plywood and an identically sized piece of carpet covering and fixed to said plywood and an angle bar is positioned about the outer edges forming said square shaped plywood and carpet to prevent the edges of said carpet from fraying and to provide a means to retain said plywood and carpet as a unit for mounting said panel on its associated frame structure.

3. The animal play unit of claim 1 wherein each one of the panels is comprised of a board and a carpet whose back face is in surface to surface engagement with the board, an angle bar surrounding and supporting the edges of said carpet and board and connecting means to retain the carpet, board and angle bar in fixed relation to its associated frame structure.

4. The animal play unit of claim 1 wherein a select number of said cube shaped frame structures and the panels associated therewith are positioned to form a series of steps, and said top surfaces of said steps on which said panels are mounted providing surfaces from which the animal can jump from one step to another.

5. Animal play unit of claim 1 wherein each of said panels has a carpet material forming its outer face surface on which the animal can grasp and scratch with his paws in a playful and beneficial manner.

6. An animal play unit comprising a frame structure, said frame structure comprising identical first, second and third hollow cube shaped unit portions in juxtaposition with respect to one another, means to interconnect the three cube unit portions of said frame structure in side by side relation with one another and panels selectively connected to top, bottom and side portions of each cube unit portion mounted to form a series of first passageways between said units through which an animal can move in one direction and means to disconnect said panels for placement in a mounted position on other different top, bottom and side portions of each cube unit portion to form a series of second passageways between said units through which the animal can move in another direction.

7. An animal play unit for self amusement and for enhancing movement, agility and jumping ability of animals, comprising three separate groups of angle bars, each group of bars being interconnected to form the peripheral edges of a different one of three separate hollow cubes, first connecting means to retain the angle bars that form a side face of a first one of said cubes in surface to surface contact with the angle bars that form the side face of a second one of said cubes, a second connecting means to retain the angle bars that form a top face of said second cube in surface to surface control with the angle bars that form a bottom surface of said third cube, said angle bars of each cube defining passageways in its top, bottom front, rear and side surfaces, a first separate series of panels, a different one of said first separate series of panels mounted on said angle bars that respectively form the right side, top, bottom and rear surface of the first cube to thereby close off the passageways in the right side, top, bottom and rear surface of the first cube;

a second separate series of panels, a different one of said second separate series of panels being mounted on said angle bars that respectively form the left side, front, rear and bottom surfaces of the second cube to thereby close off the passageways in the left side, front, rear and bottom surfaces of the second cube;

a third separate series of panels, a different one of said third separate series of panels being mounted on said angle bars that respectively form the left side, front, rear and top surfaces of the third cube to thereby close off the passageways in the left side, front, rear and top of said third cube and means to dismount each one of each series of panels from their associated angle bars for selectively positioning them on different side, top and bottom, front and rear surfaces of their respective cubes and thereby provide a variety of different uncovered faces of the cubes through which an animal can travel.

* * * * *